US006325882B1

(12) United States Patent
Schroeder

(10) Patent No.: US 6,325,882 B1
(45) Date of Patent: Dec. 4, 2001

(54) METHOD FOR PRODUCING HANGING SOAP BARS

(76) Inventor: Karl S. Schroeder, 6822 Salem Ave., Clayton, OH (US) 45315

( * ) Notice: Subject to any disclaimer, the term of this patent is extended or adjusted under 35 U.S.C. 154(b) by 0 days.

(21) Appl. No.: 09/499,664

(22) Filed: Feb. 8, 2000

Related U.S. Application Data

(60) Provisional application No. 60/119,160, filed on Feb. 8, 1999.

(51) Int. Cl.[7] .......... B32B 31/04

(52) U.S. Cl. .......... 156/228; 156/244.11; 156/244.18; 156/244.19; 156/244.22; 156/250; 156/252; 156/256; 156/263; 156/313; 156/510; 156/513; 156/517; 156/522

(58) Field of Search .......... 156/157, 228, 156/242, 243, 244.11, 214.12, 244.18, 244.19, 244.22, 244.23, 244.24, 245, 250, 252, 256, 263, 264, 269, 270, 313, 324, 324.4, 500, 510, 512, 513, 514, 516, 517, 522; 510/447, 449, 451; 248/686, 327, 328

(56) References Cited

U.S. PATENT DOCUMENTS 4,062,792 * 12/1977 McNabb .......... 252/93
4,067,946 * 1/1978 Rickert .......... 264/150

* cited by examiner

*Primary Examiner*—Michael W. Bail
*Assistant Examiner*—Jessica Rossi
(74) *Attorney, Agent, or Firm*—William Weigl

(57) ABSTRACT

A method of producing individual personal-sized bars of soap with a water-resistant supporting medium being provided integral with each bar for enabling its suspension for air drying after each use. The preferred method incorporates an intermittent feeding technique whereby a portion of the medium protrudes beyond one end of a soap bar. An alternative method incorporates a feeding technique resulting in soap bars wherein the medium and the soap material of each bar are the same length. A hole is provided either through the medium alone in the preferred method, or through both the soap and the medium in the alternative method. The method may include the additional step of providing a soap-compatible adhesive to opposite sides of the supporting medium.

11 Claims, 1 Drawing Sheet

METHOD FOR PRODUCING HANGING SOAP BARS

This invention relates to a method of producing individual, personal-sized bars of soap that may be suspended from a hook adjacent its use location for air drying after each use. This application is based on my U.S. Provisional Patent Application Ser. No. 60/119,160, filed Feb. 8, 1999.

BACKGROUND OF THE INVENTION

Suspension of a soap bar for air drying has long been a desired objective, as witnessed by the various approaches for positioning the bars above a surface in which wash water can collect. Many soap dishes have upwardly facing tines, drain flutes and ridges, all of which attempt to achieve keeping wet bars from resting in residual water and becoming mushy. Their success in achieving the desired goal has been nominal only. Such dishes require frequent cleaning because it is impossible for wet soap as it softens while dissolving during a washing operation from adhering to the tips of the tines and upper edges of the ridges or flutes. This wastes the bar as it wears, becoming an added cost burden to the user by requiring replacement more frequently than if the bar were able to be suspended in air after use.

One type of soap bar has achieved the air drying objective, that product being known as "Soap-on-a Rope". A rope is embedded within, i.e., the soap is molded about, the rope. A loop is formed in the rope to enable it to be hung from a hook or other projection. One problem with this product is its cost, however, mainly because it is labor-intensive to produce.

SUMMARY OF THE INVENTION

A method is provided for producing individual personal-sized bars of soap with a water-resistant supporting medium having a hole therein, the medium being integral with each bar for enabling its suspension from a hook for air drying after each use. The preferred method incorporates an intermittent feeding technique of a web of the medium whereby a portion of the medium protrudes beyond one end of a soap bar. An alternative method incorporates a feeding technique resulting in soap bars wherein the medium and the soap material of each bar are the same length. A hole is provided either through the medium alone in the preferred method, or through both the soap and the medium in the alternative method. The method may include the additional step of providing a soap-compatible adhesive to opposite sides of the supporting medium.

A principal object of the invention is to provide a low cost method of continuously producing soap bars with a water-resistant sheet material laminated between opposite sides of the bars and provide a hole through the sheet material to enable individual bars to be suspended in air for drying after use.

Other objects will become apparent from the following description, in which reference is made to the accompanying drawings.

DESCRIPTION OF THE PREFERRED EMBODIMENTS

Figures 1, 2, 3, 4, 5:
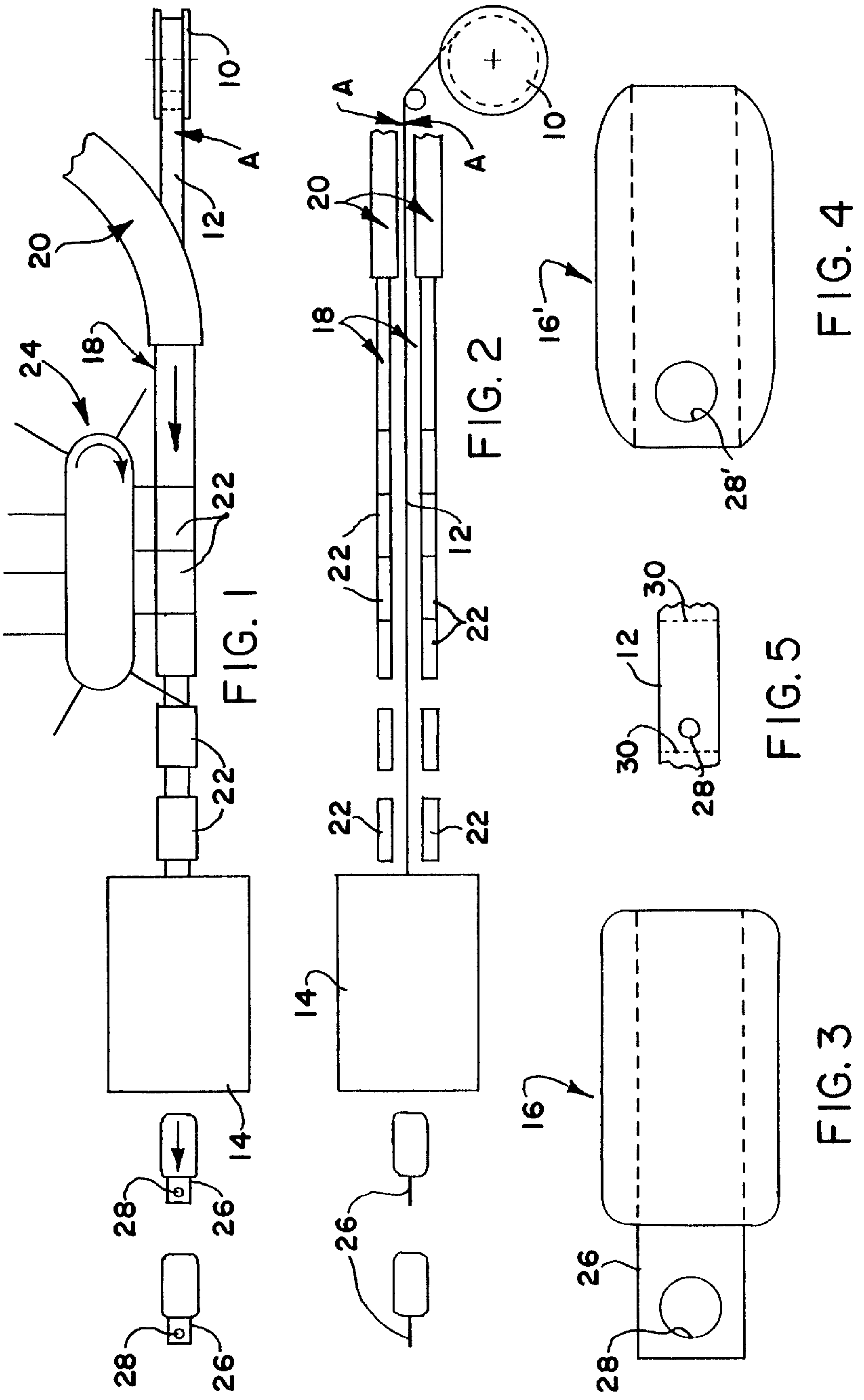
FIG. 1 is a side elevational schematic view of equipment for performing the preferred process of producing soap bars each of which has a projection of sheet material extending beyond one end of the bar.
FIG. 2 is a plan schematic view of the equipment of FIG. 1.
FIG. 3 is a side view of a preferred form of soap bar produced according to the method practiced by the equipment of FIGS. 1 and 2.
FIG. 4 is a side view of an alternative form of soap bar produced by slightly varied equipment from that illustrated in FIGS. 1 and 2.
FIG. 5 is a plan view of a web of sheet material initially prepared with holes and/or perforations prior to being fed into the equipment of FIGS. 1 and 2.

FIGS. 1 and 2 are schematic views of one set of equipment that may be used to practice the method of my invention. A reel 10 feeds a web of one-inch wide sheet material 12 to a bar molding press 14 where finished final soap bars 16 are molded onto the sheet material. The material 12 is preferably located centrally of finished bar 16 with one half of each bar formed integrally with the material 12. For enabling the integration and adherence of the soap to opposing sides of the sheet material, small perforations, roughening of the material 12, or providing a soap-compatible adhesive may be employed if desired. The material 12 will ultimately become a supporting medium for suspending a bar 16 by means of a hook, (not shown), for air drying of the bar after it has been used in water. Accordingly, the material 12 should be water-resistant, which in this instance means it will not dissolve in water. It can be sheet plastic or a plastic-coated paperboard, for example.

The method includes the introduction of semi-solid soap material 18 to the web at a point intermediate the reel 10 and the press 14. In its preferred form, the soap material 18 is extruded in half-width pairs of extended lengths from a pair of conventional extruders 20. The extended lengths are directed parallel to the web 12 alongside the web to a point at which they are severed into discrete lengths 22. A cutter 24 is simply depicted schematically in FIG. 1, it being understood that the cutter may be a flying cutter which forms straight severance line across the soap material 18.

FIG. 2 illustrates the cut discrete lengths 22 not yet in contact with the web 12. They may be made to engage in contact within the molding press 14 or just prior to arriving therein. Although not illustrated, the soap material 18, the discrete lengths 22 and the lower edge of the web 12 may be supported by belt means between the extruder 20 and the press 14. Additionally, the discrete lengths 22 may have been previously formed, and delivered by belts (not shown) in end-abutting condition to the press, particularly if there is to be no projecting portion 26 protruding from one end of the final bar 16 as seen in FIG. 3. For example, it can be seen that an alternative form of bar 16' of FIG. 4 has no such portion 26 as does a FIG. 3 bar.

FIGS. 1 and 2 illustrate the discrete lengths 22 being in abutting end-to-end relationship midway between the extruder 20 and the press 14. Then, leftwardly from that position toward the press 14, the discrete lengths 22 are spaced apart. Obviously, in order to accomplish the spacing, the soap material as it exits the extruder 20 must move at a speed less than the speed of the belts for supporting the separated lengths 22 leading to the press 14. Of necessity, therefore, support for the soap material 18 must be separate from the higher-speed belts which feed the lengths 22 into the press 14, to enable the speed-up and separation which occurs between the adjacent discrete lengths 22 when producing the final version of the soap bars 16 of FIG. 3.

The press 14 can be any type which molds final soap bars 16, and would normally be a flashstamping unit in which between 20 and 25 percent of excess soap material 18 is placed in the dies, and the excess is flashed off and recycled. In order to suspend the finished final soap bars 16 for air drying after each use by a consumer, a hole 28 is provided in the projecting portion 26 of the sheet material 18. This can be accomplished at the time of molding in press 14, immediately thereafter, or can even be formed in the web 12 prior to or just after leaving the reel 10. In case of holes 28 being formed before the web 12 is contacted by the soap material 18, it will be necessary to register the discrete soap lengths 22 with the holes in the web. This is believed to be within the scope of the artisan skilled in this field.

If desired, both the holes 28 and perforations 30 may be formed on the web before winding it on the reel 10. This is simply illustrated in FIG. 5. Use of perforations eliminates one cutter, but requires an alternative structure to separate the end products at the perforations 30 after molding.

To assist in adherence of the sides of a soap bar remaining firmly secured to the sheet material as one or both sides of a bar wears thin, both sides are preferably provided with a soap-compatible adhesive. Application of the adhesive may be made at points A in FIGS. 1 and 2, or may be supplied directly on the material mounted on the reel 10. If the latter, the web 12 may be double-sided pressure sensitive sheet material with a release liner on each side, necessitating the conventional deflection and disposal of the liner strips (not shown) as the web exits from the reel.

In the alternative final soap bar 16' of FIG. 4, a hole 28' is formed through both the halves of the soap and the sheet material. Preferably, if the final bar 16 is oval or has rounded corners, it is preferable to have the contouring occur beyond the side edges of the web, so as to enable a straight line severance or perforation across the width of the web.

Various other changes may be made without departing from the spirit and scope of my invention. For, example, the web may be fed centrally of a single soap extruder in much the same fashion as wire is conventionally coated. The extruded soap would then surround the web. This would enable reasonably effective production of bars like those of FIG. 4, i.e., bars without the projecting portions 26. If the FIG. 3 type of bars are to be produced, it would be necessary to employ special apparatus to accommodate segregating the soap into the discrete lengths with intervening projecting portions like 26. This can be done within the skill of persons in the field, by intermittently feeding the web, reciprocating the extruder end relative to web movement, or closing the end of the extruder intermittently until a section corresponding to the projecting portion 26 passes the point at which closed.

Having described my invention, I claim:

1. A method of sequentially producing personal-sized soap bars each of which has a supporting medium integral therewith for enabling hanging individual bars for air drying after each use, said method comprising the steps of:

conveying a web of water-resistant sheet material of the supporting medium at a predetermined speed in a predetermined direction along a predetermined path;

extruding a pair of extended lengths of semi-solid soap material each of which pair is slightly in excess of a half-thickness and total width of final soap bars to be produced;

conveying said pair of extended lengths alongside opposite sides of said web of sheet material parallel to said predetermined path;

severing both of said pairs of lengths of extruded semi-solid soap material into intermediate discrete lengths corresponding generally to the final soap bar length;

feeding said intermediate discrete lengths into contact with said web and conveying said sheet material and discrete lengths together into a bar molding press;

molding said sheet material and the discrete lengths of soap material into integral, individual final soap bars;

at a time after said severed lengths are conveyed into said molding press, cutting said soap bars and sheet material to finished final soap bar lengths; and forming a hole through each final length soap bar whereby to enable its being suspended from a hook received within said hole.

2. The method according to claim 1 wherein the speed of conveyance of said pair of extended lengths is less than the speed of said web and wherein said lesser speed causes said discrete lengths to be spaced longitudinally along the web during conveyance into said bar molding press, whereby each final length soap bar has a portion of sheet material protruding beyond one end after the soap bars have been cut to their finished final lengths, and wherein said hole is formed solely through said protruding portion.

3. The method according to claim 2 wherein said cutting to the finished final soap bar lengths is made to occur at points where the web joins intermediate discrete lengths.

4. The method according to claim 1 wherein said web of sheet material is originally prepared with crosswise perforations to provide tear lines, and wherein said cutting to finished final soap bar lengths incorporates a tearing type-separation at said perforations.

5. The method according to claim 4 wherein said tearing-type separation is made to occur after completion of molding.

6. The method according to claim 1 wherein the conveying of the pairs of lengths of semi-solid soap material coincides in speed with the speed of the web, wherein the final soap bars are cut to finished final length soap bar length with the ends of the sheet material coinciding with both ends of the final soap bars, and wherein the holes are formed completely through both halves of the soap material and the sheet material therebetween.

7. The method according to claim 6 wherein said web of sheet material is originally prepared with crosswise perforations to provide tear lines, and wherein said cutting to finished final soap bar lengths incorporates a tearing type-separation at said perforations.

8. The method according to claim 7 wherein said tearing-type separation is made to occur after completion of molding.

9. The method according to claim 1 wherein the holes are formed in the web prior to the pairs of extended lengths of semi-solid material contacting the web, and wherein said intermediate discrete lengths are appropriately registered longitudinally in relation to the holes in the web.

10. The method according to claim 1 including the additional step of providing a soap-compatible adhesive on opposite sides of the web of sheet material prior to contact of the intermediate discrete lengths with the web.

11. The method according to claim 10 wherein said adhesive is a double-sided self-adhesive previously created on the web.

* * * * *